United States Patent
Wingen et al.

(10) Patent No.: US 10,300,960 B1
(45) Date of Patent: May 28, 2019

(54) DEFLECTION SYSTEM FOR VEHICLES

(71) Applicants: Patrick Wingen, Vermillion, SD (US); Patrick Christopher Wingen, Sioux Falls, SD (US); Richard Sides, Decatur, TX (US); Norm Kaufman, Vermillion, SD (US); Jefferson Lehman, Elk Point, SD (US); Bruce Hart, Elk Point, SD (US)

(72) Inventors: Patrick Wingen, Vermillion, SD (US); Patrick Christopher Wingen, Sioux Falls, SD (US); Richard Sides, Decatur, TX (US); Norm Kaufman, Vermillion, SD (US); Jefferson Lehman, Elk Point, SD (US); Bruce Hart, Elk Point, SD (US)

(73) Assignee: Aaladin Industries, Inc., Elk Point, SD (US)

( * ) Notice: Subject to any disclaimer, the term of this patent is extended or adjusted under 35 U.S.C. 154(b) by 0 days.

(21) Appl. No.: 15/404,303

(22) Filed: Jan. 12, 2017

(51) Int. Cl.
| | |
|---|---|
| *B62D 25/18* | (2006.01) |
| *B62D 25/16* | (2006.01) |
| *B60D 1/58* | (2006.01) |
| *B60D 1/06* | (2006.01) |

(52) U.S. Cl.
CPC ............ *B62D 25/163* (2013.01); *B60D 1/06* (2013.01); *B60D 1/58* (2013.01); *B62D 25/182* (2013.01)

(58) Field of Classification Search
CPC ...... B62D 25/16; B62D 25/18; B62D 25/166; B62D 25/182; B62D 25/184; B62D 25/163; B62D 25/168; B62D 25/188
See application file for complete search history.

(56) References Cited

U.S. PATENT DOCUMENTS

| | | | | |
|---|---|---|---|---|
| 1,754,147 A | * | 4/1930 | Cookson | B62D 25/18 280/851 |
| 1,795,366 A | * | 3/1931 | Hardy | B62D 25/18 280/851 |
| 2,640,714 A | * | 6/1953 | Garner | B62D 25/188 248/292.13 |
| 2,935,336 A | * | 5/1960 | Case | B62D 25/188 280/851 |
| 3,091,478 A | * | 5/1963 | Ambli | B62D 25/188 280/851 |

(Continued)

FOREIGN PATENT DOCUMENTS

| | | | |
|---|---|---|---|
| CH | 676830 A5 | * 3/1991 | |
| GB | 2208160 A | * 3/1989 | ........... B62D 25/188 |

(Continued)

*Primary Examiner* — Jacob B Meyer
(74) *Attorney, Agent, or Firm* — Jeffrey A. Proehl; Woods, Fuller, Shultz & Smith, P.C.

(57) ABSTRACT

An deflection system for a vehicle to deflect flying debris may comprise an elongated support assembly configured to be supported on the vehicle such that the support assembly extends laterally with respect to the vehicle, and a deflection structure extending downwardly from the support assembly. The deflection structure may comprise a plurality of deflection elements including a first deflection element and a second deflection element positioned rearwardly of the first deflection element. The first deflection element may comprise a plurality of deflection bristles and the second deflection element may comprise at least one deflection panel.

19 Claims, 12 Drawing Sheets

(56) References Cited

U.S. PATENT DOCUMENTS

| | | | | |
|---|---|---|---|---|
| 3,244,432 A * | 4/1966 | Ambli | ............... | B62D 25/188 280/851 |
| 3,778,086 A * | 12/1973 | Moore | ............... | B62D 25/188 280/851 |
| 3,830,520 A * | 8/1974 | Kelly | ............... | B62D 25/188 280/851 |
| D249,500 S * | 9/1978 | Cox | ............... | D12/185 |
| 4,357,030 A * | 11/1982 | Verge | ............... | B62D 25/18 280/851 |
| 4,377,294 A * | 3/1983 | Lockwood | ............... | B62D 25/16 280/851 |
| 4,421,333 A * | 12/1983 | Van Dyke | ............... | B62D 25/186 16/322 |
| 4,453,728 A * | 6/1984 | Verge | ............... | B62D 25/18 16/305 |
| 4,487,422 A * | 12/1984 | Turunen | ............... | B62D 25/18 280/851 |
| 4,572,532 A * | 2/1986 | Early | ............... | B62D 25/188 24/500 |
| 4,796,906 A * | 1/1989 | Sullivan | ............... | B62D 25/188 280/851 |
| 5,121,944 A * | 6/1992 | Haddox | ............... | B62D 25/188 280/848 |
| D328,447 S * | 8/1992 | Ahleen | ............... | D12/185 |
| D338,863 S * | 8/1993 | Nakayama | ............... | D12/185 |
| 5,833,254 A * | 11/1998 | Bucho | ............... | B62D 25/188 280/154 |
| D415,086 S * | 10/1999 | Larkin | ............... | D12/185 |
| 6,076,842 A * | 6/2000 | Knoer | ............... | B62D 25/188 224/42.31 |
| 6,179,311 B1 * | 1/2001 | Larkin | ............... | B62D 25/188 280/154 |
| 6,197,144 B1 * | 3/2001 | Mahn, Jr. | ............... | B32B 27/06 156/240 |
| 6,347,809 B1 * | 2/2002 | Mack | ............... | B62D 25/188 280/154 |
| 6,357,780 B1 * | 3/2002 | Young | ............... | B60D 1/241 224/448 |
| 6,375,223 B1 * | 4/2002 | Kirckof | ............... | B62D 25/188 280/154 |
| 6,394,475 B1 * | 5/2002 | Simon | ............... | B62D 25/188 248/221.11 |
| 6,485,059 B2 * | 11/2002 | Burnstein | ............... | B62D 25/188 280/851 |
| 6,604,724 B2 * | 8/2003 | Hawes | ............... | B62D 25/166 248/309.1 |
| 6,799,782 B2 * | 10/2004 | Jain | ............... | B62D 25/161 280/847 |
| 6,942,252 B2 * | 9/2005 | Buuck | ............... | B62D 25/188 280/154 |
| 6,953,205 B2 * | 10/2005 | Friest | ............... | B60R 13/0861 280/154 |
| 6,955,369 B1 * | 10/2005 | Schiebout | ............... | B60D 1/58 280/154 |
| 7,407,194 B1 * | 8/2008 | Alley | ............... | B62D 25/188 280/154 |
| 7,931,302 B2 * | 4/2011 | Vaughn | ............... | B62D 25/188 280/154 |
| 8,608,203 B2 * | 12/2013 | Downes | ............... | B62D 25/18 280/848 |
| 8,668,227 B1 * | 3/2014 | Peotter | ............... | B62D 25/209 280/847 |
| 8,783,727 B2 * | 7/2014 | Flaman | ............... | B62D 25/188 280/851 |
| 8,919,818 B2 * | 12/2014 | Kim | ............... | B60R 13/0861 280/847 |
| 9,108,683 B2 * | 8/2015 | Ramsey | ............... | B62D 25/166 |
| 9,387,888 B2 * | 7/2016 | Schmeichel | ............... | B60D 1/58 |
| 9,422,009 B2 * | 8/2016 | Schmeichel | ............... | B60D 1/58 |
| 9,610,982 B2 * | 4/2017 | Denu | ............... | B62D 25/166 |
| 9,724,974 B2 * | 8/2017 | Schmeichel | ............... | B60D 1/58 |
| 2001/0030407 A1 * | 10/2001 | Burnstein | ............... | B62D 25/188 280/154 |
| 2002/0020794 A1 * | 2/2002 | Hawes | ............... | B62D 25/166 248/309.1 |
| 2002/0043797 A1 * | 4/2002 | Cicansky | ............... | B62D 25/188 280/847 |
| 2003/0227168 A1 * | 12/2003 | Buuck | ............... | B62D 25/188 280/851 |
| 2005/0146129 A1 * | 7/2005 | Andrews | ............... | B62B 9/16 280/851 |
| 2007/0216128 A1 * | 9/2007 | Morton | ............... | B62D 25/188 280/154 |
| 2008/0277895 A1 * | 11/2008 | Cicansky | ............... | B62D 25/188 280/154 |
| 2009/0194967 A1 * | 8/2009 | Vaughn | ............... | B62D 25/186 280/154 |
| 2011/0042932 A1 * | 2/2011 | Vogel | ............... | B62D 25/188 280/848 |
| 2011/0248490 A1 * | 10/2011 | Downes | ............... | B62D 25/18 280/851 |
| 2013/0221650 A1 * | 8/2013 | Wiltshire | ............... | B62D 25/182 280/847 |
| 2014/0042736 A1 * | 2/2014 | Flaman | ............... | B62D 25/182 280/851 |
| 2014/0183850 A1 * | 7/2014 | Kim | ............... | B62D 25/16 280/848 |
| 2014/0252754 A1 * | 9/2014 | Ramsey | ............... | B62D 25/166 280/851 |
| 2016/0001820 A1 * | 1/2016 | Schmeichel | ............... | B60D 1/58 280/851 |
| 2016/0001821 A1 * | 1/2016 | Denu | ............... | B62D 25/166 280/154 |
| 2016/0031488 A1 * | 2/2016 | Wylezinski | ............... | B62D 25/163 280/154 |
| 2016/0114835 A1 * | 4/2016 | Schmeichel | ............... | B60D 1/58 280/851 |
| 2016/0318554 A1 * | 11/2016 | Schmeichel | ............... | B60D 1/58 |

FOREIGN PATENT DOCUMENTS

| | | | | |
|---|---|---|---|---|
| GB | 2224251 A | * | 5/1990 | ............ B62D 25/188 |
| KR | 2014104683 A | * | 9/2015 | |
| WO | WO8500330 A | * | 1/1985 | |

* cited by examiner

DEFLECTION SYSTEM FOR VEHICLES

BACKGROUND

Field

The present disclosure relates to debris deflection devices and more particularly pertains to a new deflection system for mounting on a vehicle for deflecting flying matter raised by the movement of a vehicle while dissipating the energy of the matter.

SUMMARY

In one aspect, the present disclosure relates to a system for positioning toward a rear of a vehicle for deflecting flying debris. The system may comprise an elongated support assembly configured to attach to the vehicle such that the support assembly extends laterally with respect to the vehicle between opposite ends, and a deflection structure extending downwardly from the support assembly. The deflection structure may comprise a plurality of deflection elements including a first deflection element and a second deflection element positioned rearwardly of the first deflection element, with the first deflection element comprising a plurality of deflection bristles and the second deflection element comprising at least one deflection panel.

In another aspect, the disclosure relates to a system for positioning toward a rear of a vehicle for deflecting flying debris, the vehicle having a tow hitch assembly. The system may comprise an elongated support assembly configured to be supported on the tow hitch assembly of the vehicle such that the support assembly extends laterally with respect to the vehicle between opposite ends, a deflection structure extending downwardly from the support assembly, and a mounting structure configured to removably mount the support assembly on the tow hitch assembly of the vehicle. The mounting structure may be configured to position the support assembly on a tow hitch assembly in at least two discrete adjustment positions.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
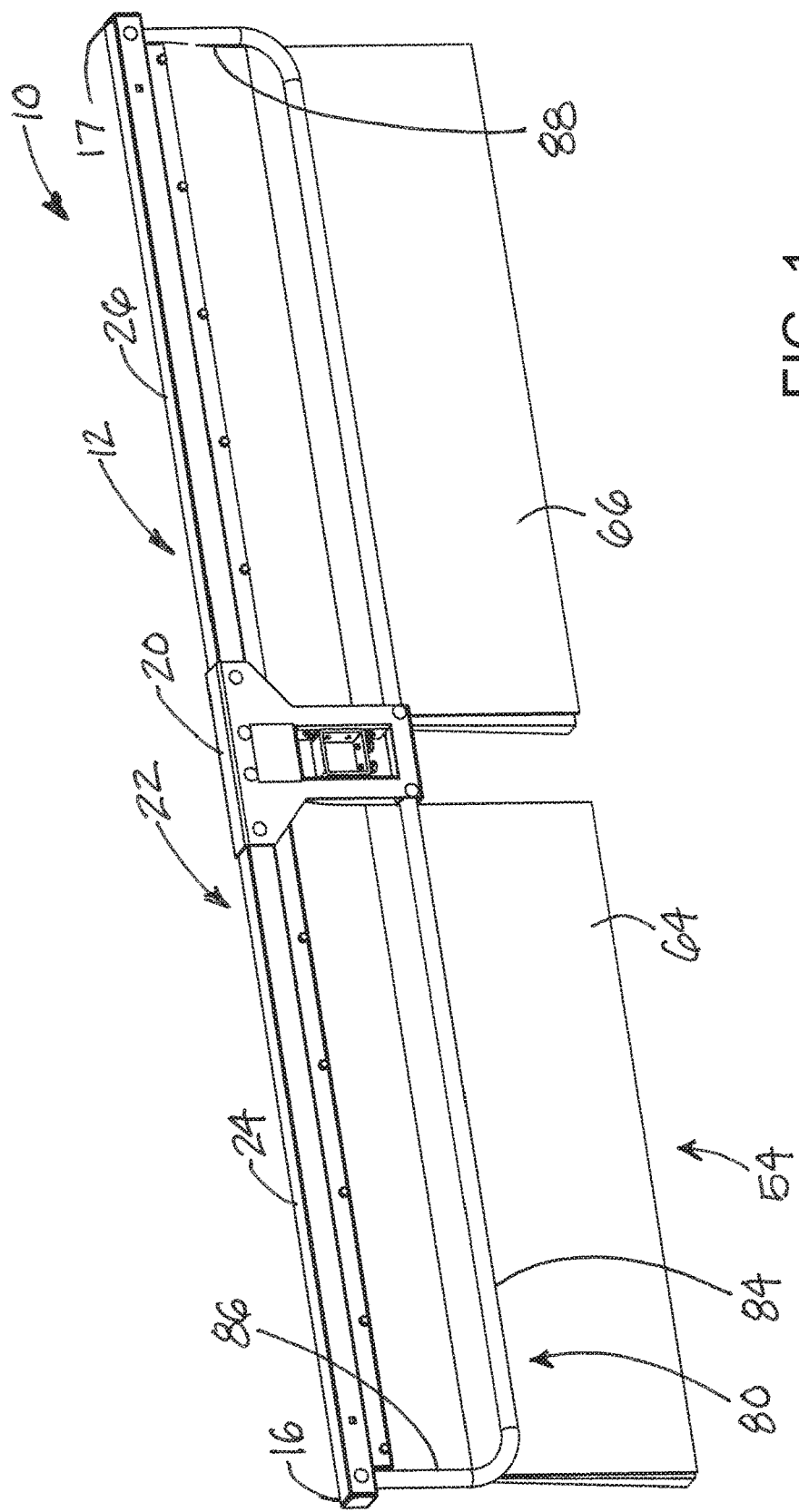
FIG. 1 is a schematic perspective view of a new deflection system for a vehicle, according to the present disclosure.
Figure 2:
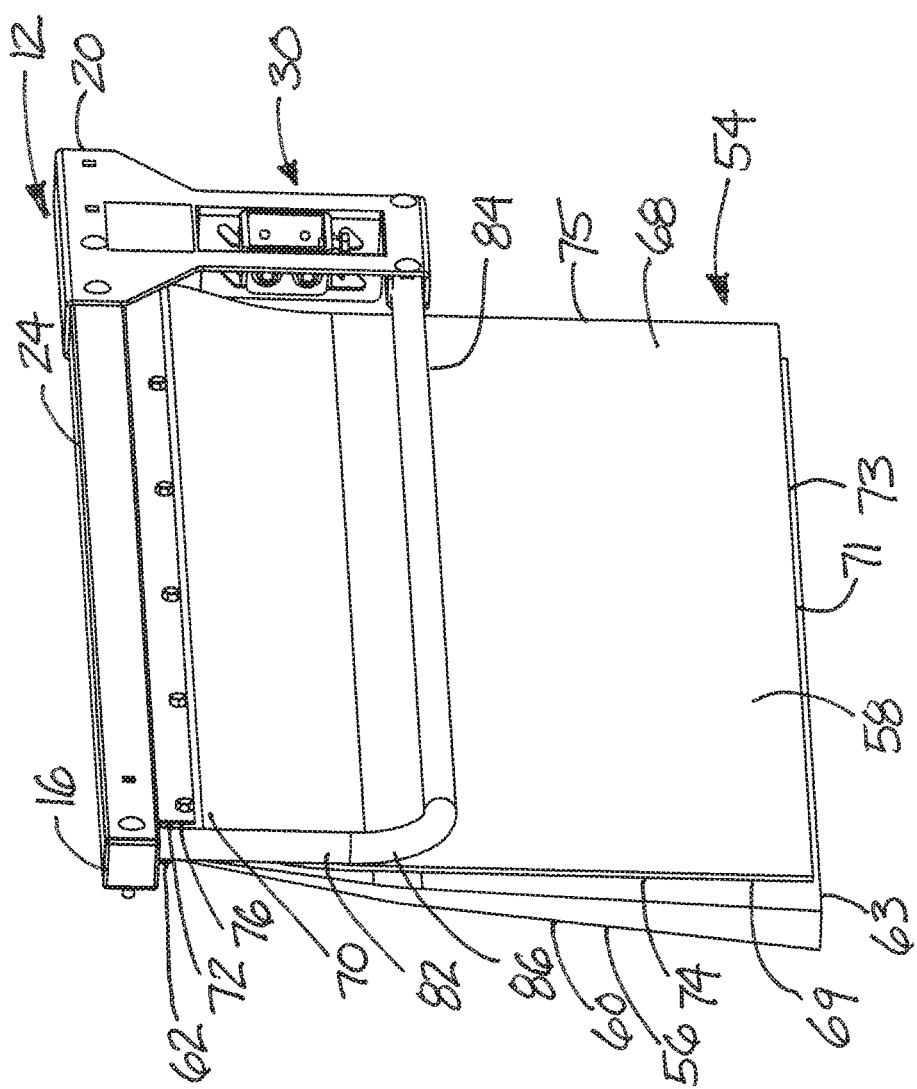
FIG. 2 is a schematic perspective view of a portion of the deflection system, according to an illustrative embodiment.
Figure 3:
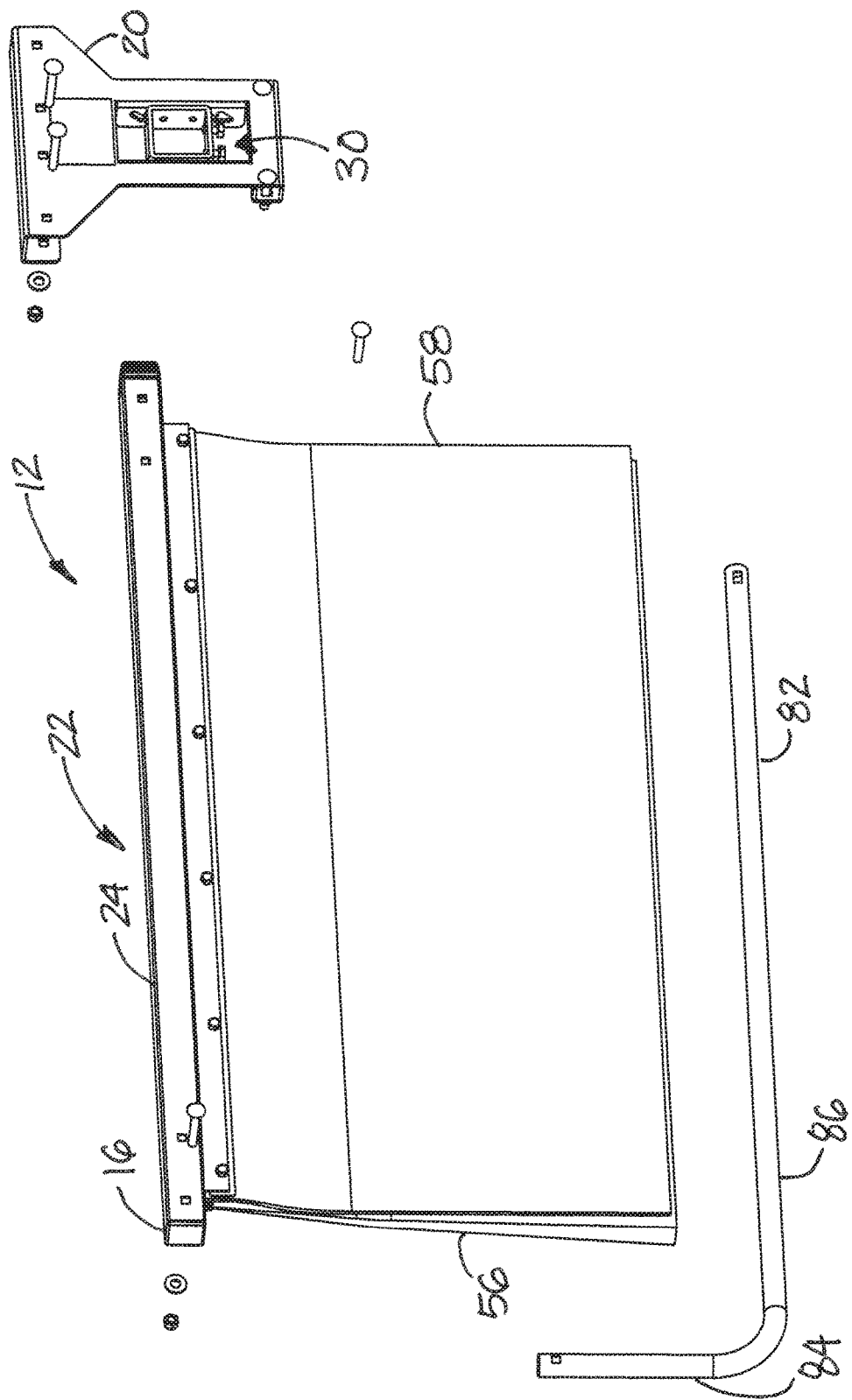
FIG. 3 is a schematic exploded perspective view of the portion of the deflection system, according to an illustrative embodiment.
Figure 4:
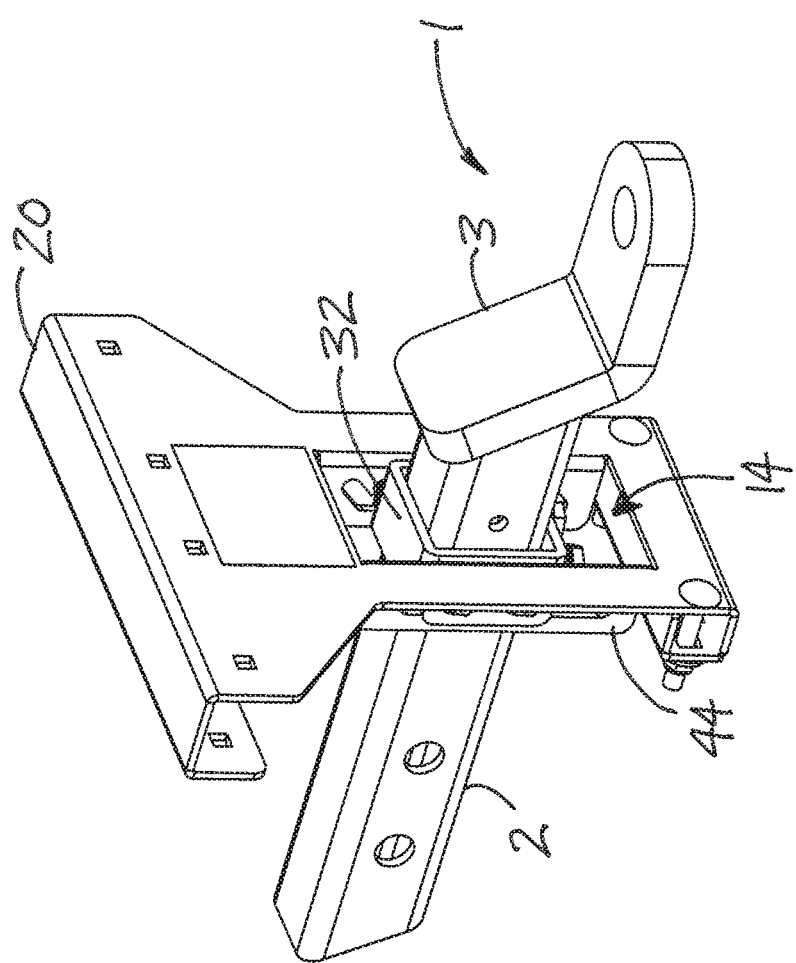
FIG. 4 is a schematic side perspective view of an illustrative mounting structure and a portion of the support assembly of the system shown mounted on a tow hitch assembly, according to an illustrative embodiment.
Figure 5:
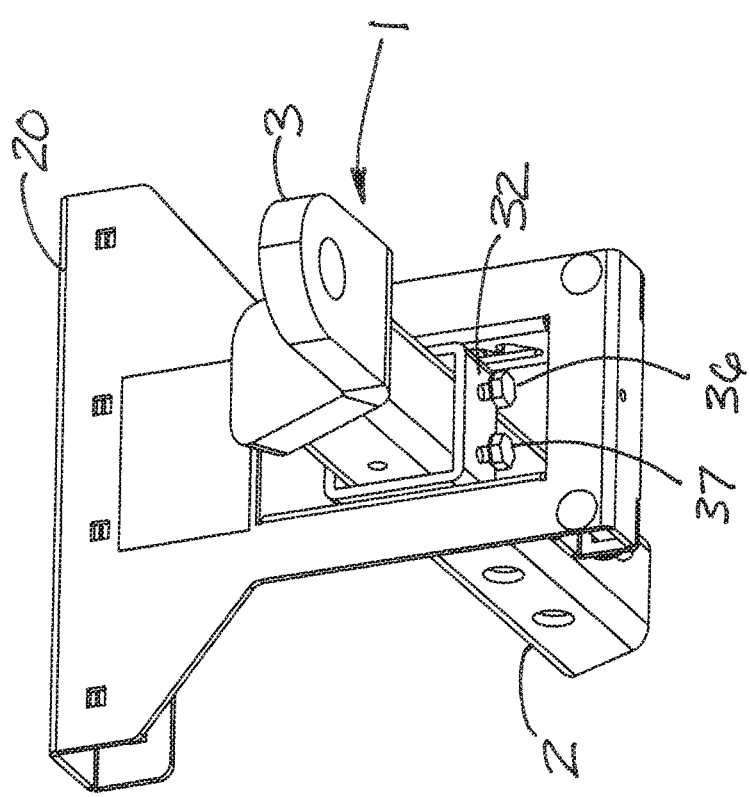
FIG. 5 is a schematic perspective view of the mounting structure and portions of the support structure and deflection structure of the system, according to an illustrative embodiment.
Figure 6:
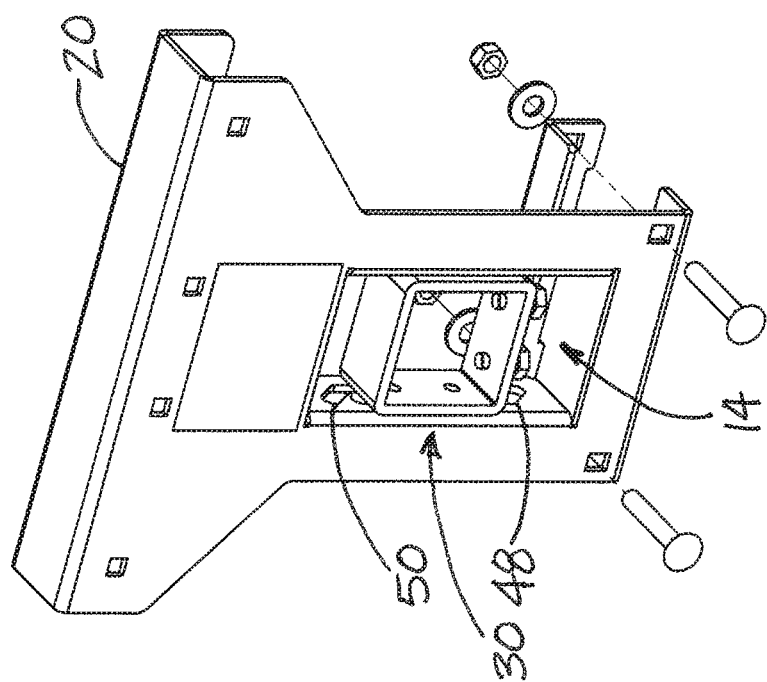
FIG. 6 is a schematic partially exploded front perspective view of the mounting structure of the system, according to an illustrative embodiment.
Figure 7:
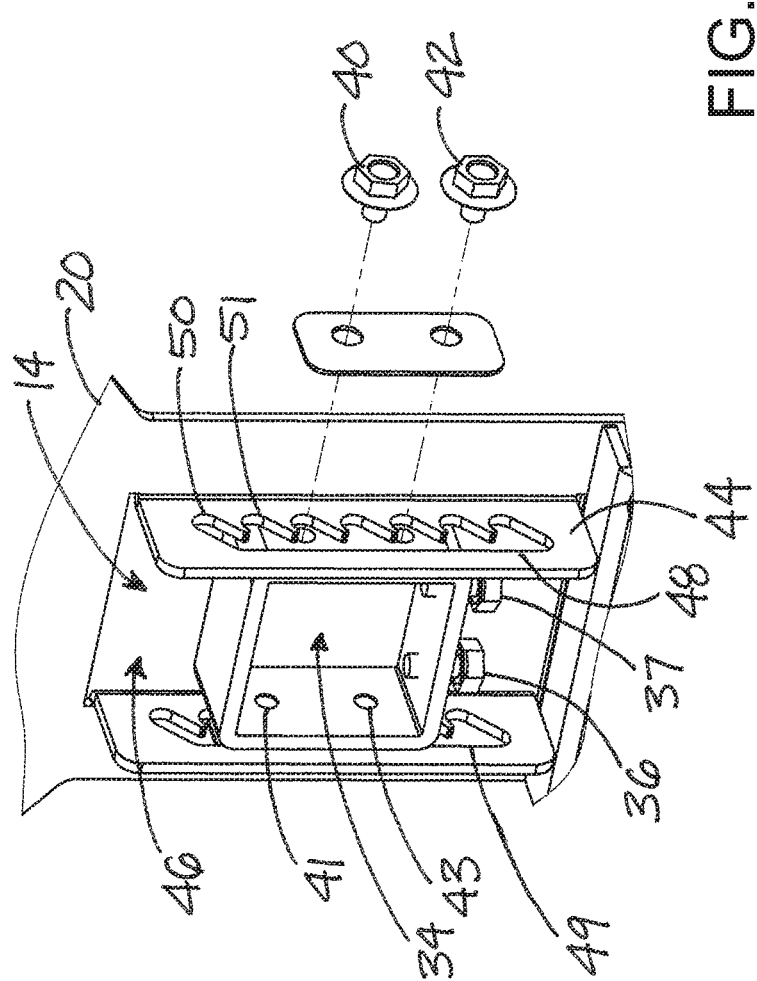
FIG. 7 is a schematic partially exploded rear perspective view of the mounting structure of the system, according to an illustrative embodiment.
Figure 8:
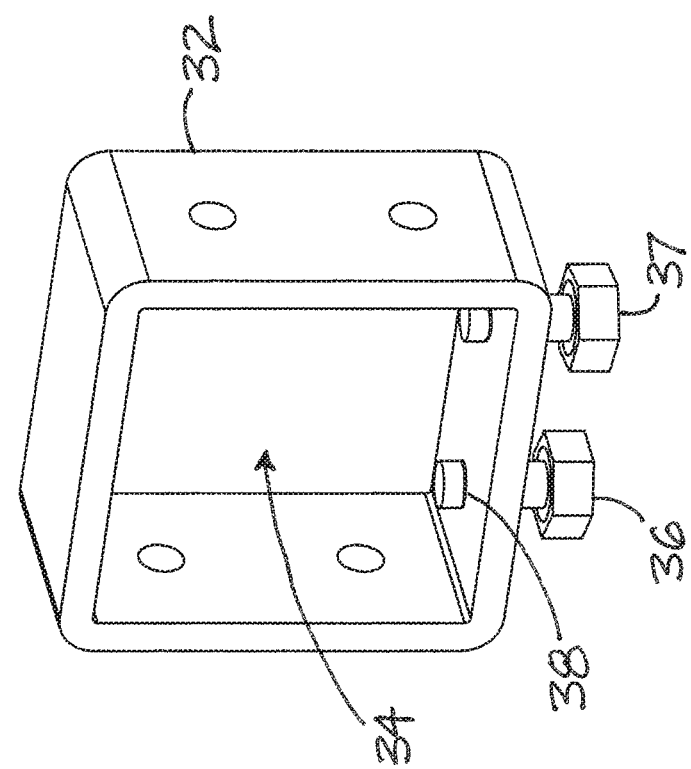
FIG. 8 is a schematic perspective view of the mounting collar and mounting members of the mounting structure of the system, according to an illustrative embodiment.
Figure 9:
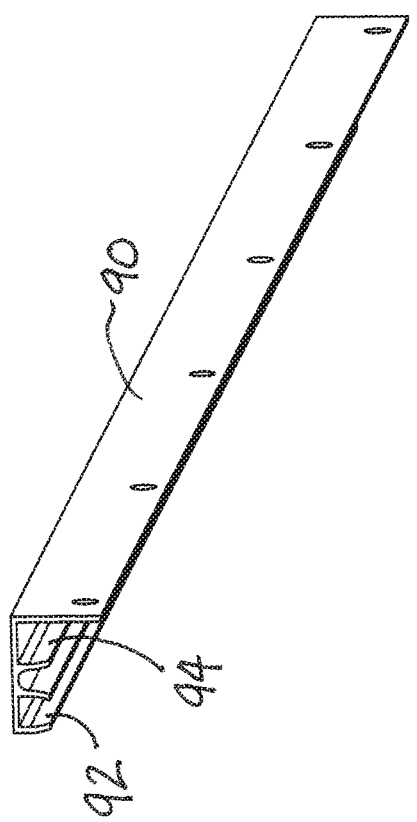
FIG. 9 is a schematic perspective view of a mounting track of the system, according to an illustrative embodiment.
Figure 10:
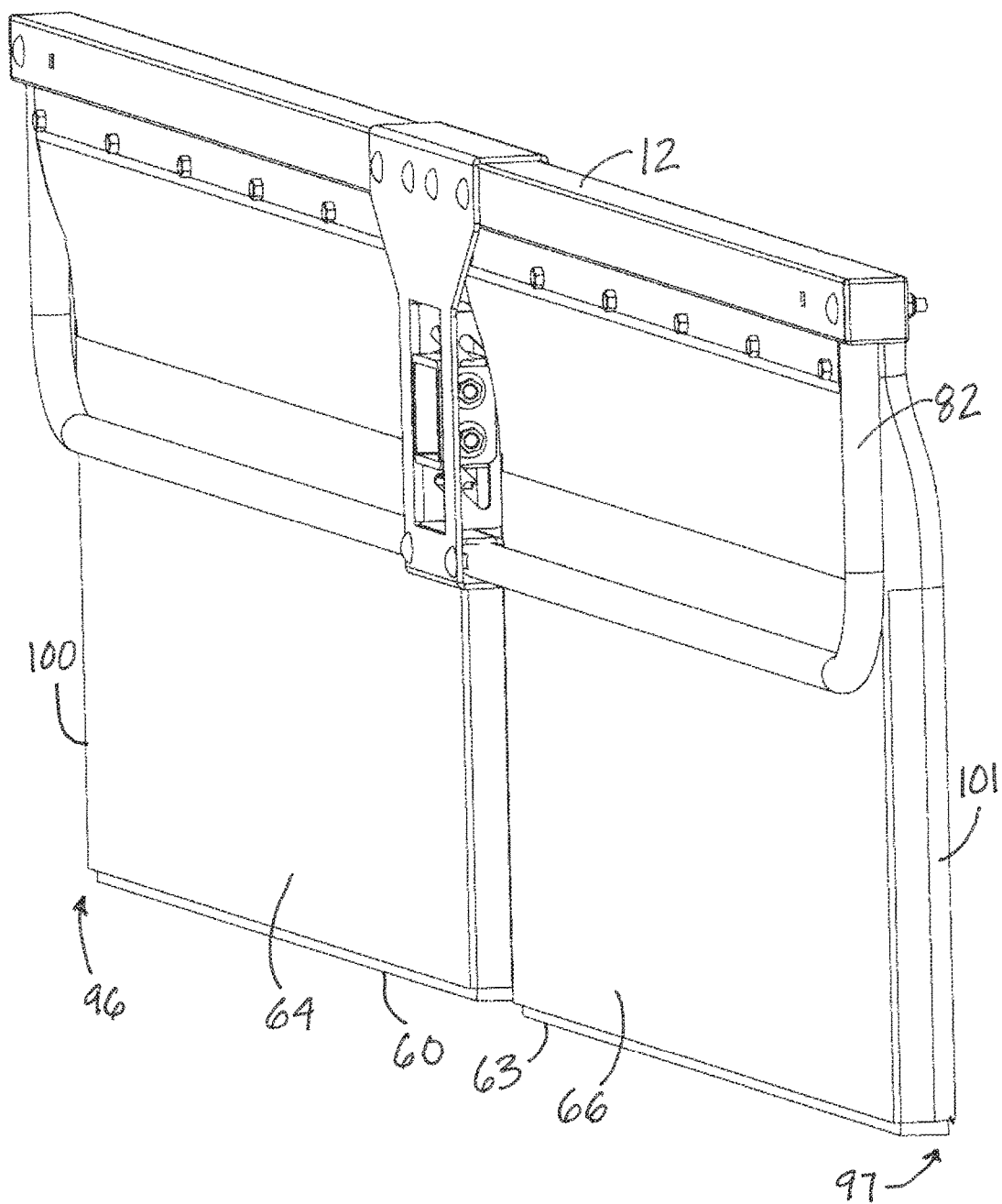
FIG. 10 is a schematic perspective view of an embodiment of the system having deflection panels with portions that extend forwardly from the outer edges of the panels.
Figure 11:
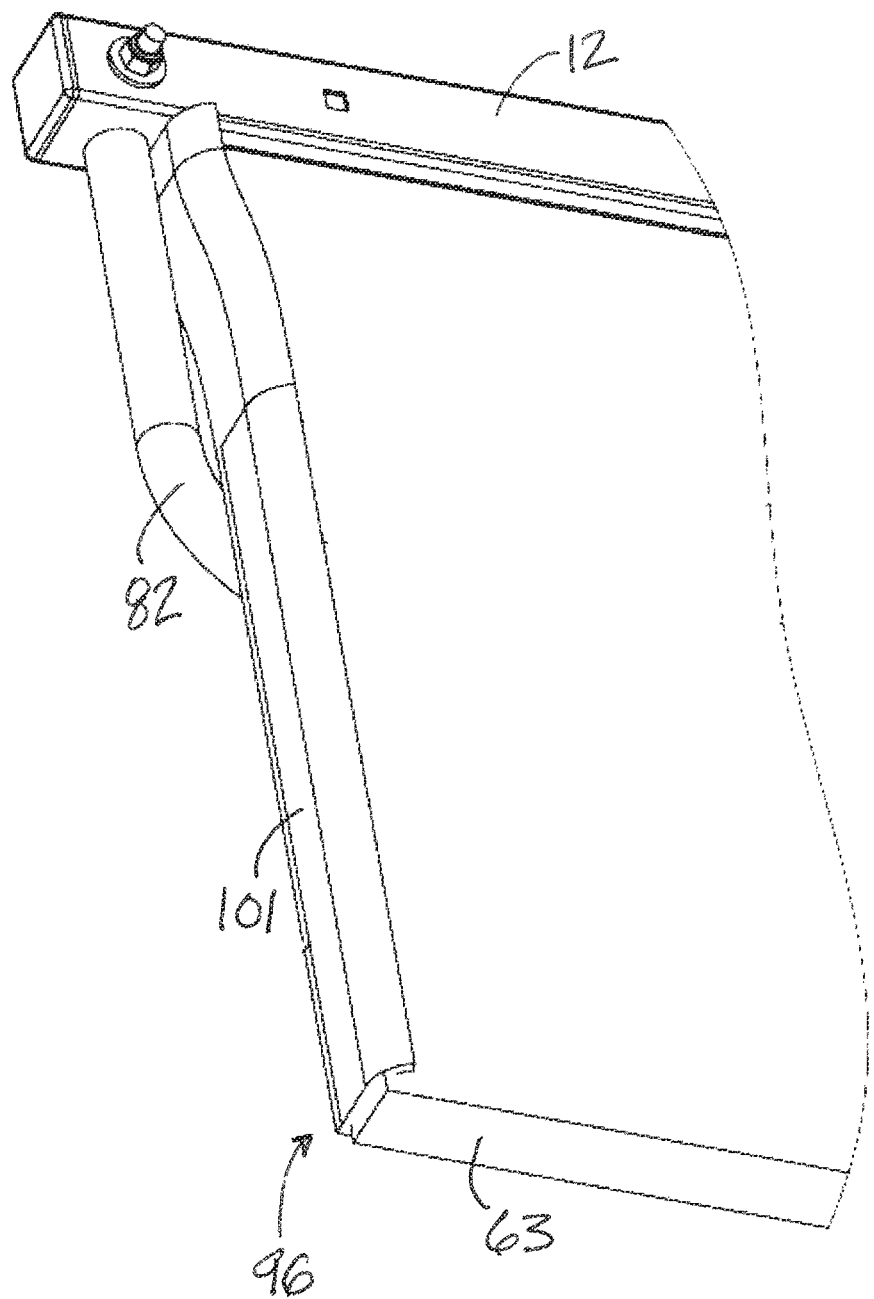
FIG. 11 is a schematic perspective view of a portion of the system in FIG. 10 showing one of the forwardly extending portions of the deflection panels.

With reference now to the drawings, and in particular to FIGS. 1 through 13 thereof, a new deflection system for vehicles embodying the principles and concepts of the disclosed subject matter will be described.

The applicants recognized that debris such as rocks and dust and moisture lifted from the road surface by the movement of a vehicle over the surface can impair the vision of drivers of closely following vehicles, as well as impact and damage things following closely (and sometimes not so closely) behind the vehicle, such as a trailer (and any exposed contents of the trailer) being towed by the vehicle, or another vehicle. So-called "mud flaps" have been mounted on vehicles to help to divert the flying debris downwardly toward the road surface, but often offer coverage only for debris raised by the rear wheels. Flaps that extend across the rear of the vehicle have been used but can contribute a degree of drag to the movement of the vehicle. One highly effective alternative solution is disclosed in U.S. Pat. No. 6,955,369 to Schiebout, which is assigned to the same assignee as this application and is hereby incorporated by reference in its entirety, employs a plurality of bristles to knock down flying debris and moisture.

The applicants also recognize that improvements could be made in the technology in order to improve the degree to which energy is dissipated from the flying debris and thus improve the likelihood that the debris will remain on the ground surface after being intercepted in flight. The applicants have thus devised a deflection system with elements designed to block flying matter or debris such as rocks, dust, moisture and the like from moving rearwardly from the vehicle while also having elements designed to dissipate or attenuate the energy of the flying debris so that the flying debris is less likely to rebound upwardly after being knocked down by the system.

In one aspect, the disclosure is directed to a system 10 for positioning toward the rear of the vehicle for deflecting flying debris and moisture that may be thrown rearwardly by rotation of the tires of the vehicle as it travels along a road as well as any other debris lifted by the rush of air movement from the vehicle passing over the ground surface. The system 10 may be removably mounted on the tow hitch assembly 1 which is typically positioned adjacent to, and normally below, the rear bumper of the vehicle. The tow hitch assembly 1 may include a tow hitch receiver 2 with a socket which is configured to removably receive a hitch ball support 3 on which a hitch ball may be mounted. It should be recognized that other suitable means for mounting the system on a vehicle may be used, and may not provide quick and easy removal of the system from the vehicle.

The system 10 may include a support assembly 12 which is configured to be supported on the tow hitch assembly 1 of the vehicle, and may optionally be mounted on the hitch receiver 2 or the ball support 3. The support assembly 12 may have a recess 14 for receiving a portion of the tow hitch assembly for mounting the 12 assembly on the hitch assembly. The support assembly 12 may be elongated to extend in a lateral direction with respect to a longitudinal direction of the vehicle, which is typically also the direction of travel of the vehicle. The support assembly may have opposite ends 16, 17 which may be positioned adjacent to opposite lateral sides of the vehicle when the system is mounted on the vehicle.

The support assembly 12 may include a support base 20 which defines the recess 14 for receiving the tow hitch assembly. The support base 20 may be substantially centrally located between the opposite ends 16, 17 of the assembly 12. The support assembly may also include an elongated support member 22 which is mounted on and extends laterally from the support base 20. In some embodiments, a pair of the support bars 24, 26 is mounted on the support base and extend in laterally opposite directions from the support base to the opposite ends 16, 17 of the support assembly. Illustratively, the bars 24, 26 may be mounted on opposite sides of the base 20.

The system 10 may also include a mounting structure 30 which may be configured to removably mount the support assembly 12 on the tow hitch assembly in a transverse orientation with respect to the longitudinal axis of the vehicle. The mounting structure 30 may be configured to position the support assembly on the tow hitch assembly in at least two discrete adjustment positions which are located at different vertical heights or positions with respect to the ground surface below the vehicle, although it should be recognized that adjustability of the position of the system is not necessarily provided. In some of the illustrative embodiments, the mounting structure is configured to define approximately five discrete adjustment positions for the support assembly on the hitch assembly.

In some embodiments, the mounting structure 30 may comprise a mounting collar 32 which has a mounting opening 34 which is configured to receive a portion of the tow hitch assembly vehicle. The mounting collar 32 may be positioned in the recess 14 of the support assembly, and the mounting collar may be configured with a size and shape which permits adjustment of the position of the mounting collar in the recess 14 in a substantially vertical direction. The size of the mounting opening 34 may be configured to receive the end portion of the tow hitch receiver 2, including any flanges formed on the receiver.

The mounting structure 30 may also include at least one mounting member 36 for bearing against the portion of the tow hitch assembly when it is inserted into the mounting opening 34 of the collar 32 in order to fix the mounting collar on the inserted portion of the tow hitch assembly. The mounting member 36 may be mounted on the mounting collar and extend into the mounting opening, and may be adjustable in position to adjust the degree to which the mounting member extends into the mounting opening. In some embodiments, a pair of the mounting members 36, 37 is implemented for abutting against the tow hitch assembly in at least two locations. The mounting member may be threadedly mounted on an aperture 38 formed in the mounting collar such that rotation of the mounting member in a first rotational direction advances the mounting member into the mounting opening, and rotation of the mounting member in a second rotational direction withdraws the mounting member from the mounting opening. Illustratively, the mounting members comprise a bolt fastener although other structures may be employed.

The mounting structure 30 may also include at least one mounting pin 40 which is mounted on the mounting collar 32 and extends outwardly from the mounting collar. Illustratively, a pair of mounting pins 40, 41 may extend from the mounting collar in substantially opposite directions with respect to each, and in the illustrative embodiments a pair of mounting pins 40, 42 extend in a first direction and a pair of mounting pins 41, 43 extend in a second, opposite direction. Illustratively, the mounting pins may comprise fasteners that are removably mounted on the collar 32, and in some embodiments the mounting pins may be formed by bold fasteners which are removably mounted in the collar 32. In some embodiments, pinch plates may be mounted on and bridge between pairs of the mounting pins.

The mounting structure 30 may further include a mounting frame 44 which is positioned about the mounting collar 32 and may be configured such that the mounting collar is adjustably movable in the mounting frame. The mounting frame may define a passage 46 which may be in substantial alignment with the recess 14 in the support assembly. The mounting collar may be positionable in the passage 46 in at least two discrete adjustment positions, and may be adjustable in a vertical direction between the adjustment positions. The mounting frame 44 may be mounted on the support base 20, and by virtue of the mounting frame being mounted on the mounting collar, and the mounting collar being mounted on the tow hitch assembly, the support assembly may thereby be mounted on the tow hitch assembly. The adjustable positioning of the mounting collar with respect to the support assembly provides adjustable positioning of the support assembly (and those elements mounted thereon) on the tow hitch assembly of the vehicle.

The mounting frame 44 may define at least one mounting slot 48 which is configured to receive at least one of the mounting pins on the mounting collar. Illustratively, a pair of mounting slots 48, 49 is positioned on substantially opposite sides of the mounting frame to receive mounting pins located on opposite sides of the mounting collar. In some embodiments, each of the mounting slots may include at least two slot bays 50, 51 which are configured to removably receive the mounting pins. For embodiments employing a pair of mounting pins on each side of the mounting collar, the spacing between slot bays may generally correspond to the spacing between the mounting pins on the side, and in some embodiments the distance between adjacent slot bays may be approximately half of the distance between the mounting pins on a side of the mounting collar to provide greater precision in adjustment of the pins in the slot bays. Each slot bay may correspond with one or two of the discrete adjustment positions of the mounting structure. Each mounting slot may include more than two slot bays which to provide a plurality of positions of the mounting collar on the mounting frame.

The system 10 may also include a deflection structure 54 which generally extends downwardly from the support assembly 12 under the influence of gravity on the structure 54. In some embodiments, a plurality of deflection elements 56, 58 may be utilized which extend away from the support assembly in substantially the same downward direction. Significant embodiments include a combination of types of deflection elements which are highly suitable for not only deflecting debris away from a trailer being towed, but also for decreasing the energy with which the debris moves to thereby lessen the possibility of secondary deflection or bouncing of the debris off of the ground surface. The elements 56, 58 of the deflection structure 54 may be flexible in character, but also may be rigid or substantially rigid in a manner that provides significant resistance to bending of the elements.

More specifically, the plurality of deflection elements 56, 58 may include a first deflection element 56 that comprises a plurality of deflection bristles 60 which depend outwardly from the support assembly. Base ends 62 of the deflection bristles 60 may be fixed to the support assembly with ends 63 of the bristles located opposite of the base ends being substantially freely movable. The bristles 60 may be formed of resiliently flexible material. The plurality of deflection elements may also include a second deflection element 58 that comprises at least one deflection panel 64, and may include a pair of the deflection panels 64, 66. Each of the panels may have a front face 68 for orienting forwardly and toward the wheels of the vehicle, and a rear face 69 for orienting rearwardly away from the wheels. The base ends 70 of the deflection panels 64, 66 may be fixed to the support assembly and ends 71 of the panels located opposite of the base ends may be free and substantially freely movable. Each deflection panel may be a thin panel of sheet material which may be resiliently flexible. The deflection panel may have a top edge 72 and a bottom edge 73, and may be continuous between the top and bottom edges. The deflection panel may also have a first edge 74 at an outboard side and a second edge 75 at an inboard side, with the panel being continuous between the first 74 and second 75 edges. A base strip 76 may be mounted on the base ends of one or both of the deflection elements 56, 58, and may collectively join the bristles 60 of the deflection element 56 together. The lengths of the first and second deflection elements may be substantially equal, but may also vary from each other up to approximately 25 percent of the lengths.

The first deflection element 56 may be positioned forwardly of the second deflection element 58, and the first deflection element 56 may be located adjacent to the front face 68 of the second deflection element. Thus, plurality of deflection bristles 60 may be located forwardly of the at least one deflection panel, and at least some of the deflection bristles may be positioned adjacent to, and may be in contact with, the front face of the deflection panel or panels. Significantly, debris moving rearwardly toward the deflection structure encounters the plurality of bristles both prior to and after striking the front face of the deflection panel. While the front face of the deflection panel may present a relatively flat surface capable of bouncing the debris back to the ground surface with a significant degree of energy, the presence of the relatively loose bristles in front of the front face tends to reduce or prevent high energy rebounds by the debris.

The system may also include a reinforcing structure 80 which is configured to limit rearward movement of the deflection structure 54 when the deflection structure is mounted on the vehicle and the vehicle is moving forwardly such that momentum and moving air may act upon the elements 56, 58 to move them rearwardly and possibly reduce the effectiveness. The reinforcing structure 80 may comprise an elongated reinforcing element 82 which is configured to be positioned rearwardly of the deflection structure to define a rearwardmost limit to the movement of the deflection structure. In some embodiments, the deflection structure may extend in a generally horizontal direction at a distance from the support member that is equal to approximately one third to approximately two thirds of the vertical length of the deflection structure from the support member. The reinforcing structure 80 may contact the deflection structure along a substantially horizontal line.

In some embodiments, the reinforcing element 82 may comprise a first portion 84 which extends transverse to and rearwardly of the deflection structure. The reinforcing elements may also include a second 86 and third 88 portions which each extend from one of the opposite ends of the first portion to mount on one of the opposite ends of the support assembly. The second 86 and third 88 portions of the reinforcing element may extend generally vertically downward from the support assembly to the first portion. The second and third portions of the reinforcing elements 82 may be substantially rigid for resisting movement of the first portion with respect to the support assembly so that the first portion is able to resist or block rearward movement of the deflection elements past the position of the reinforcing element.

Figure 13:
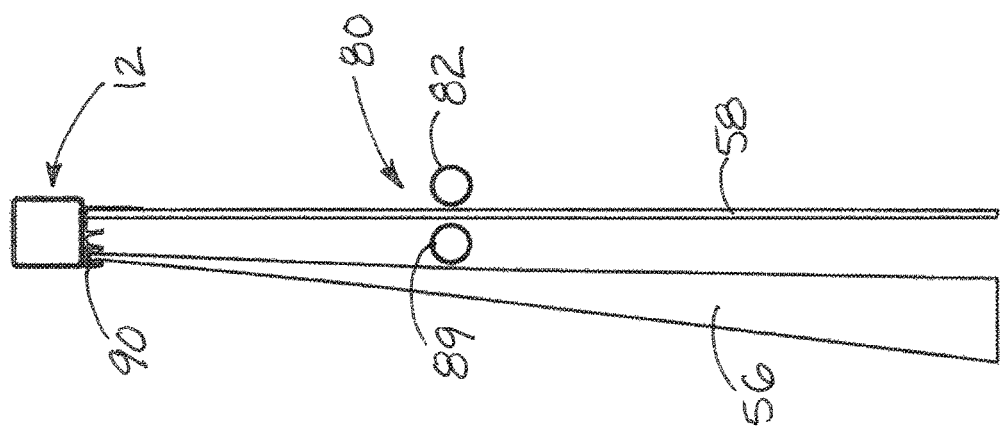
FIG. 13 is a side sectional view of an embodiment of the system in which a reinforcing structure is employed for the first deflection element and for the second deflection element
Figure 12:
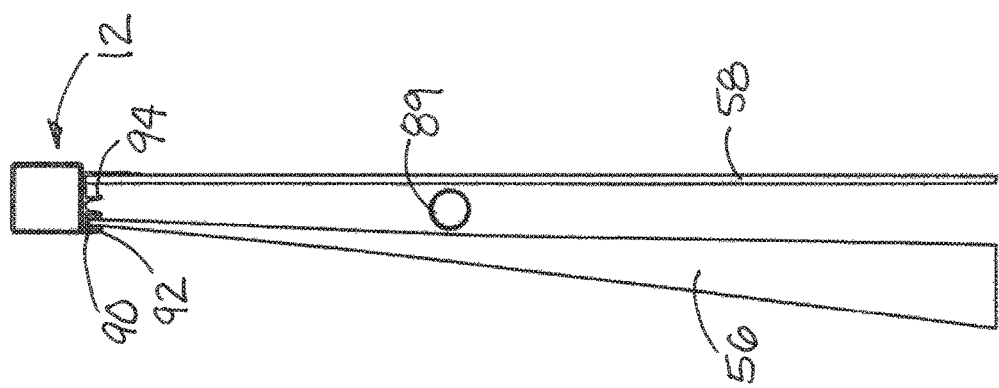
FIG. 12 is a side sectional view of an embodiment of the system in which a reinforcing structure is employed for the first deflection element.

In some embodiments, such as are shown in FIGS. 12 and 13, the reinforcement element or elements may have various positions relative to the deflection elements 56, 58, In some embodiments, a reinforcing element 89 may be positioned rearwardly of the first deflection element 56, and may be positioned forwardly of the second deflection element 58, so that the reinforcing element 89 is positioned between the deflection elements. Such embodiments may be advantageous for maintaining a degree of separation of the first and second deflection elements even at relatively higher travel speeds when air flow under the vehicle may tend to press the bristles of the first deflection element against the second deflection element and as a result might diminish the ability of the bristles to reduce the energy of the flying debris striking the system. In some embodiments, the deflection element 89 may be combined with a deflection element 82 that is positioned rearwardly of the second deflection element 58 to reinforce the second deflection element against rearward movement.

The support assembly of the system may also include a mounting track 90 which is configured to mount the deflection structure on the support member. The mounting track 90 may define at least one groove for removably slidably receiving the base strip 76 of a respective one of the deflection structures. The mounting track 90 may be mounted on the bottom of the support assembly and may extend along a portion of the support member, such as along a respective one of the support bars 24, 26. The mounting track 90 may form two grooves 92, 94 which extend parallel to the longitudinal axis of the support assembly and are configured to receive a pair of the base strips of the deflection elements. In some embodiments, the mounting track 90 of the support assembly may be directly attached on the vehicle, such as on the bumper or the body, and other structure of the support assembly described herein may be omitted.

In some embodiments, the outboard sides 96, 97 of the deflection panels may extend forwardly out of the plane of the remainder of the panel to help resist debris moving past the edges at the outboard sides of the panels and may also help contain the bristles 60 located at the outboard sides. As illustratively shown in FIGS. 10 and 11, forwardly extending portions 100, 101 of the panels may be curved or folded forwardly from the primary planes of the respective panels at the outboard sides 96, 97 and the portions 100, 101 may each have sections that are oriented substantially perpendicular to the main plane of the panels. The portions 100, 101 may extend along the outboard sides 96, 97 of the panels from about the base end 70 to about the free end 71 of the panel.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for positioning toward a rear of a vehicle for deflecting flying debris, the vehicle having a front opposite of the rear of the vehicle, the system comprising:

an elongated support assembly configured to attach to the vehicle such that the support assembly extends laterally with respect to the vehicle between opposite ends;

a deflection structure mounted on and extending downwardly from the support assembly;

wherein the deflection structure comprises a plurality of deflection elements including a first deflection element extending downwardly from the support assembly and a second deflection element extending downwardly from the support assembly and positioned rearwardly of the first deflection element, the first deflection element comprising a plurality of deflection bristles and the second deflection element comprising at least one deflection panel;

wherein the plurality of deflection bristles of the first deflection element and the at least one deflection panel of the second deflection element are independently movable of each other below the support assembly; and wherein the support assembly is configured to support the deflection structure on the vehicle so that the plurality of deflection bristles of the first deflection element are positioned forwardly of the at least one deflection panel of the second deflection element to facilitate the flying debris to encounter the plurality of deflection bristles prior to striking the at least one deflection panel.

2. The system of claim 1 wherein at least one deflection panel includes a pair of deflection panels.

3. The system of claim 1 wherein the plurality of deflection bristles are located adjacent to the at least one deflection panel.

4. The system of claim 1 wherein at least some of the deflection bristles are in contact with the at least one deflection panel.

5. The system of claim 1 wherein the at least one deflection panel comprises a thin continuous panel.

6. The system of claim 1 additionally comprising a reinforcing structure configured to limit rearward movement of the deflection structure when the deflection structure is mounted on the vehicle.

7. The system of claim 6 wherein the reinforcing structure comprises an elongate reinforcing element configured to contact the deflection structure along a substantially horizontal line on the deflection structure spaced downwardly from the support assembly.

8. The system of claim 1 wherein the vehicle has a tow hitch assembly and the support assembly is configured to be supported on the tow hitch assembly of the vehicle.

9. The system of claim 8 wherein the support assembly has a recess for receiving a portion of the tow hitch assembly of the vehicle.

10. The system of claim 9 wherein the support assembly includes:

a support base defining the recess for receiving a portion of the tow hitch assembly of the vehicle; and an elongated support member mounted on and extending laterally from the support base.

11. The system of claim 1 additionally comprising a mounting structure configured to removably mount the support assembly on a tow hitch assembly of the vehicle, the mounting structure being configured to position the support assembly on the tow hitch assembly in at least two discrete adjustment positions.

12. The system of claim 11 wherein the mounting structure comprises:

a mounting collar having a mounting opening configured to receive a portion of the tow hitch assembly, the mounting collar being positioned in the recess of the support assembly;

a mounting frame mounted on the support base of the support assembly and being positioned about the mounting collar and configured such that the mounting collar is adjustably movable in the mounting frame, the mounting frame defining a passage in communication with the recess of the support assembly; and at least one mounting pin mounted on the mounting collar and extending outwardly from the mounting collar to engage the mounting frame to provide at least two discrete adjustment positions of the mounting collar in the passage.

13. The system of claim 12 wherein the mounting frame defines at least one mounting slot configured to receive the mounting pin on the mounting collar, the mounting slot including at least two slot bays configured to removably receive the at least one mounting pins.

14. The system of claim 12 wherein the mounting structure comprises:

at least one mounting member for bearing against a portion of the tow hitch assembly inserted into the mounting opening of the mounting collar to fix the mounting collar on a portion of the tow hitch assembly.

15. The system of claim 1 wherein the deflection elements of the deflection structure are formed of a flexible material.

16. The system of claim 6 wherein the reinforcing structure comprises a reinforcement element positioned between the first and second deflection elements.

17. The system of claim 1 wherein each of the deflection bristles is elongated with a length of a said deflection bristle defined between a base end of the bristle at the support assembly and a free end of the bristle located opposite of the base end of the bristle, the at least one deflection panel having a length of the panel being defined between a base end of the panel at the support assembly and a free end of the panel located opposite of the base end of the panel; and wherein the lengths of the deflection bristles are substantially equal to the length of the at least one deflection panel.

18. A system for positioning toward a rear of a vehicle for deflecting flying debris, the system comprising:

an elongated support assembly configured to attach to the vehicle such that the support assembly extends laterally with respect to the vehicle between opposite ends;

a deflection structure mounted on and extending downwardly from the support assembly;

wherein the deflection structure comprises a plurality of deflection elements including a first deflection element extending downwardly from the support assembly and a second deflection element extending downwardly from the support assembly and positioned rearwardly of the first deflection element, the first deflection element comprising a plurality of deflection bristles and the second deflection element comprising at least one deflection panel;

wherein the plurality of deflection bristles of the first deflection element and the at least one deflection panel of the second deflection element are independently movable of each other below the support assembly;

a mounting structure configured to removably mount the support assembly on a tow hitch assembly of the vehicle, the mounting structure being configured to position the support assembly on the tow hitch assembly in at least two discrete adjustment positions;

wherein the mounting structure comprises:

a mounting collar having a mounting opening configured to receive a portion of the tow hitch assembly, the mounting collar being positioned in the recess of the support assembly;

a mounting frame mounted on the support base of the support assembly and being positioned about the mounting collar and configured such that the mounting collar is adjustably movable in the mounting frame, the mounting frame defining a passage in communication with the recess of the support assembly;

at least one mounting pin mounted on the mounting collar and extending outwardly from the mounting collar to engage the mounting frame to provide at least two discrete adjustment positions of the mounting collar in the passage;

wherein the mounting frame defines at least one mounting slot configured to receive the mounting pin on the mounting collar, the mounting slot including at least two slot bays configured to removably receive the at least one mounting pins;

wherein the mounting structure comprises:

a pair of the mounting pins extending from the mounting collar in substantially opposite directions with respect to each other; and wherein the at least one mounting slot comprises a pair of mounting slots positioned on substantially opposite sides of the mounting frame, each of the slots receiving one of the mounting pins.

19. A system for positioning toward a rear of a vehicle for deflecting flying debris, the system comprising:

an elongated support assembly configured to attach to the vehicle such that the support assembly extends laterally with respect to the vehicle between opposite ends;

a deflection structure mounted on and extending downwardly from the support assembly;

wherein the deflection structure comprises a plurality of deflection elements including a first deflection element extending downwardly from the support assembly and a second deflection element extending downwardly from the support assembly and positioned rearwardly of the first deflection element, the first deflection element comprising a plurality of deflection bristles and the second deflection element comprising at least one deflection panel;

wherein the support assembly is configured to support the deflection structure on the vehicle so that the plurality of deflection bristles of the first deflection element are positioned forwardly of the at least one deflection panel of the second deflection element to facilitate the flying debris to encounter the plurality of deflection bristles prior to striking the at least one deflection panel;

wherein each of the deflection bristles is elongated along a longitudinal axis, the at least one deflection panel having a face defining a plane; and wherein the longitudinal axes of the deflection bristles are oriented substantially parallel to the plane of the face of the at least one deflection panel.

* * * * *